(12) United States Patent
Liu et al.

(10) Patent No.: US 10,402,260 B2
(45) Date of Patent: Sep. 3, 2019

(54) METHOD AND APPARATUS FOR HANDLING ERRORS IN A STORAGE SYSTEM UTILIZING A HARDWARE-ENVIRONMENT-BASED PLATFORM OR A VIRTUAL-ENVIRONMENT-BASED PLATFORM

(71) Applicant: EMC IP Holding Company LLC, Hopkinton, MA (US)

(72) Inventors: Bing Liu, Tianjin (CN); Man Lv, Beijing (CN); Alice Cuicui Zhao, Beijing (CN); Martin Chaojun Mei, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 254 days.

(21) Appl. No.: 15/463,140

(22) Filed: Mar. 20, 2017

(65) Prior Publication Data

US 2017/0269990 A1    Sep. 21, 2017

(30) Foreign Application Priority Data

Mar. 18, 2016 (CN) .......................... 2016 1 0159266

(51) Int. Cl.
*G06F 11/07* (2006.01)
*G06F 11/14* (2006.01)
*G06F 9/455* (2018.01)

(52) U.S. Cl.
CPC ...... *G06F 11/0793* (2013.01); *G06F 11/0727* (2013.01); *G06F 11/0757* (2013.01); *G06F 9/45533* (2013.01); *G06F 11/1438* (2013.01)

(58) Field of Classification Search
CPC ............ G06F 11/0712; G06F 11/0727; G06F 11/757; G06F 11/0793; G06F 11/142; G06F 11/1438; G06F 11/1441; G06F 11/1484; G06F 11/301; G06F 11/3034; G06F 9/45533; G06F 9/45575; G06F 9/45591
See application file for complete search history.

(56) References Cited

U.S. PATENT DOCUMENTS

| 5,664,093 | A | * | 9/1997 | Barnett ................ G06F 11/142 706/45 |
| 6,983,362 | B1 | * | 1/2006 | Kidder ................ G06F 11/0709 707/999.002 |
| 7,120,837 | B1 | * | 10/2006 | Ferris .................. G06F 11/0727 714/56 |
| 2003/0204780 | A1 | * | 10/2003 | Dawkins ............. G06F 11/0712 714/24 |
| 2005/0050401 | A1 | * | 3/2005 | Matsuki .............. G06F 11/0727 714/42 |
| 2006/0253740 | A1 | * | 11/2006 | Ritz .................... G06F 11/0769 714/38.13 |
| 2009/0094484 | A1 | * | 4/2009 | Son ..................... G06F 11/0709 714/26 |

(Continued)

*Primary Examiner* — Gabriel Chu
(74) *Attorney, Agent, or Firm* — BainwoodHuang

(57) ABSTRACT

Various embodiments of the present disclosure provide a method and apparatus for handling errors in a storage system. The method includes: determining configuration of a failed platform of a storage system; based on the determined configuration of the platform, determining policy for handling errors; and in response to detecting the errors, handling errors with the policy.

17 Claims, 8 Drawing Sheets

(56) References Cited

U.S. PATENT DOCUMENTS

| | | | |
|---|---|---|---|
| 2010/0058108 A1* | 3/2010 | Nammatsu | G06F 11/0709 714/4.1 |
| 2010/0153776 A1* | 6/2010 | Vick | G06F 9/30123 714/15 |
| 2014/0059392 A1* | 2/2014 | Ren | G06F 11/301 714/47.4 |
| 2016/0055045 A1* | 2/2016 | Souza | G06F 11/0712 714/57 |

* cited by examiner

METHOD AND APPARATUS FOR HANDLING ERRORS IN A STORAGE SYSTEM UTILIZING A HARDWARE-ENVIRONMENT-BASED PLATFORM OR A VIRTUAL-ENVIRONMENT-BASED PLATFORM

RELATED APPLICATIONS

This application claim priority from Chinese Patent Application Number CN201610159266.X, filed on Mar. 18, 2016 at the State Intellectual Property Office, China, titled "METHOD AND DEVICE FOR HANDLING ERRORS IN STORAGE SYSTEM" the contents of which is herein incorporated by reference in its entirety.

FIELD

Embodiments of the present disclosure generally relate to the field of storage, and more specifically, to a method and apparatus for handling errors in a storage system.

BACKGROUND

Error detection and handling of a storage system is an important part of storage management. Take small computer system interface (SCSI), as an example, it is a communication protocol widely used in the storage field. SCSI on LINUX platform has a three-layer implementation. The upper layer acts as a model for different types of SCSI devices (for example, magnetic disk, magnetic tape or optical drive). The lower layer, as host bus adapter (HBA) hardware, is usually provided by the HBA vendor. The mid layer, as core layer of SCSI, is responsible for SCSI device scanning, command scheduling and error handling. One of the SCSI command errors is command timeout, that is, the storage device cannot return any response until timeout occurs. Such kind of command timeout happens due to many kinds of reasons and is difficult to handle due to lack of relevant information. In the traditional solution, on one hand, error handling lacks adaptability, and thus it is rather time-consuming. On the other hand, supplier-specific or protocol-specific error handling approach, though effective in shortening error handling time, lacks universality.

SUMMARY

The first aspect of the present disclosure provides a method of handling an error in a storage system, comprising: determining a configuration of a platform for detecting an error in the storage system: determining a policy for handling the error based on the determined configuration of the platform; and in response to detecting the error, handling the error with the policy.

In some embodiments, the determining a policy for handling the error comprises: determining, based on the determined configuration of the platform, a time limit for handling the error.

In some embodiments, the method further comprises: determining, based on the determined configuration of the platform, a time window for detecting the error; and in response to a response of the storage system to a command exceeding the time window, determining that the error is detected.

In some embodiments, the determining a configuration of a platform comprises: determining whether the platform is a hardware-environment-based platform or a virtual-environment-based platform.

In some embodiments, the handling the error with the policy comprises: determining, with the platform, a component where the error is located; and handling, with the policy, the error of the component based on the component.

In some embodiments, the handling the error with the policy comprises: in response to determining that the platform is a hardware-environment-based platform, obtaining error information of at least one of a host bus adapter and a storage device in the storage system; and in response to determining that the platform is a virtual-environment-based platform, obtaining error information of a permanent device loss of a storage device in the storage system.

In some embodiments, the handling the error with the policy comprises: in response to determining that the platform is a hardware-environment-based platform, obtaining error information of a host bus adapter of the storage system; in response to obtaining the error information, stopping attempting a task abort operation that aborts a storage task in the storage system; and restarting the host bus adapter.

In some embodiments, the handling the error with the policy comprises: in response to determining that the platform is a hardware-environment-based platform, obtaining error information of a storage device in the storage system; in response to obtaining the error information, stopping attempting a bus reset operation that resets a bus of the storage system; and removing the storage device from the storage system.

In some embodiments, the handling the error with the policy comprises: in response to determining that the platform is a virtual-environment-based platform, obtaining error information of a permanent device loss of a storage device in the storage system; and in response to obtaining the error information of the permanent device loss, removing the storage device from the storage system.

The second aspect of the present disclosure provides A device for handling errors in a storage system, comprising: a processor configured to: determine a configuration of a platform for detecting an error in the storage system; determine a policy for handling the error based on the determined configuration of the platform; and in response to detecting the error, handle the error with the policy.

The third aspect of the present disclosure provides a computer program product for handling errors in the storage system, the computer program product being tangibly stored in a non-transitory computer readable medium and comprising machine-executable instructions which, when implemented, cause the machine to implement steps of the method according the first aspect of the present disclosure.

It should be understood that that the summary part does not intend to indicate essential or important features of the embodiments of the present disclosure or to limit the scope of the present disclosure. Other features of the present disclosure will be easier to understand with the following depiction.

BRIEF DESCRIPTION OF THE DRAWINGS

Features and advantages of the present disclosure will be easier to understand by depicting example embodiments of drawings. In the drawings.

In all the figures, same or similar reference numbers represent the same or similar elements.

DETAILED DESCRIPTION

Now, principles of the present disclosure will be depicted with reference to several example embodiments. It should be understood that these embodiments are only provided for enabling those skilled in the an to better understand and then further implement embodiments of the present disclosure, which are not intended to limit the scope of the present invention in any manner. The content of the disclosure depicted herein can be implemented in various manners apart from that disclosed in the following text.

As used herein, the term "includes" and its variants are to be read as open-ended terms that mean "includes, but is not limited to". The term "based on" is to be read as "based at least in part on." The term "one example embodiment" is to be read as "at least one example embodiment" and the term "another embodiment" is to be read as "at least one another embodiment".

Figure 1:
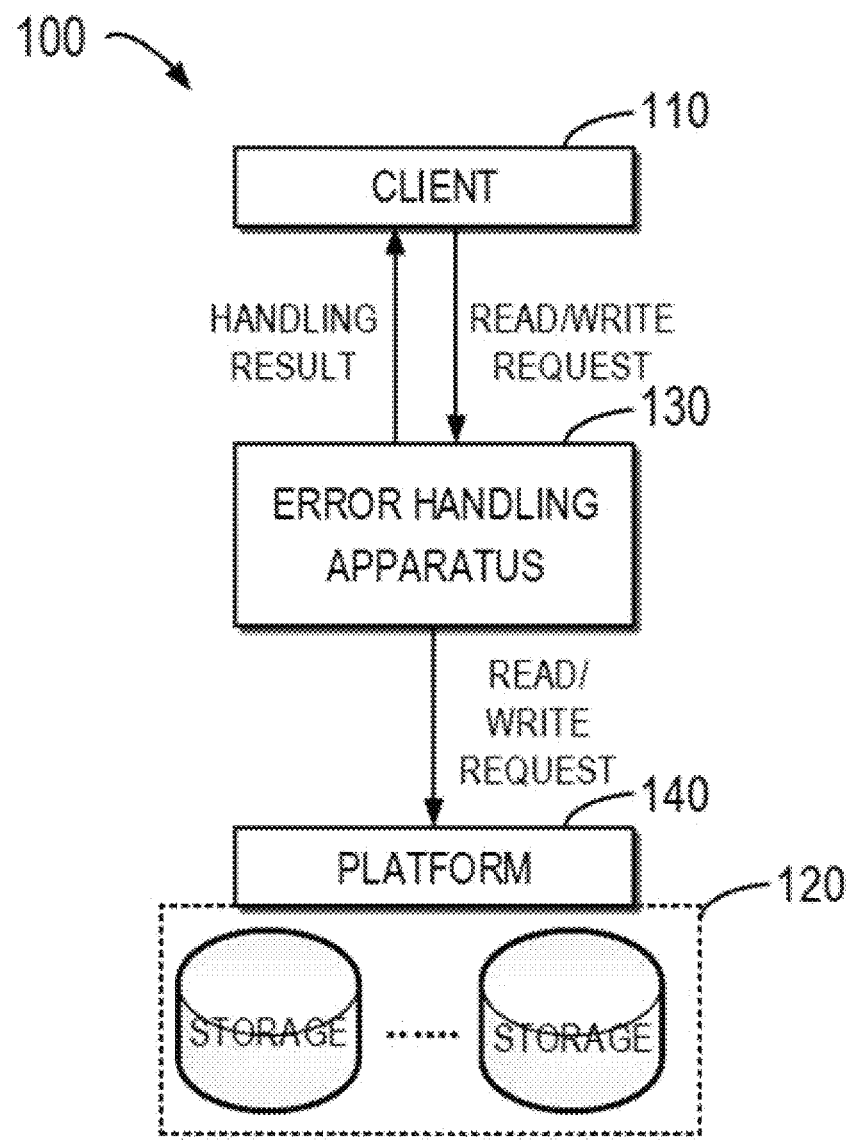
FIG. 1 illustrates a schematic of the system for handling errors in the storage system according to the embodiments of the present disclosure.

FIG. 1 illustrates the schematic of the system 100 for handling errors in the storage system 120 according to the embodiments of the present disclosure. As shown, the system 100 includes a client 110, a storage system 120, and an error handling apparatus 130 coupled between client 110 and storage system 120. The storage system 120 is further attached with a platform 140 for detecting hardware component error in the storage system 120 in a hardware environment or in a virtual environment. In the storage system 120 as shown in FIG. 1, each storage apparatus may include HBA, multiple storage devices, such as disks, connected to the same HBA, and the connection structure there between. For the sake of clarity, these components are not shown.

During operation, the operating system of client 110 sends read/write (I/O) request to the storage system 120. When an error is detected, for instance, when command transmitted by the operating system of client 110 to save/store a file has timeout and gets no response, the error handling apparatus 130 is started to firstly prevent read/write request from upper layer application of the client 110 and to begin handling the detected error (also called error recovery). After such error handling process has been completed, the error handling apparatus 130 removes prevention of read/write request from the upper layer application and returns the error handling result to client 110.

Figure 2:
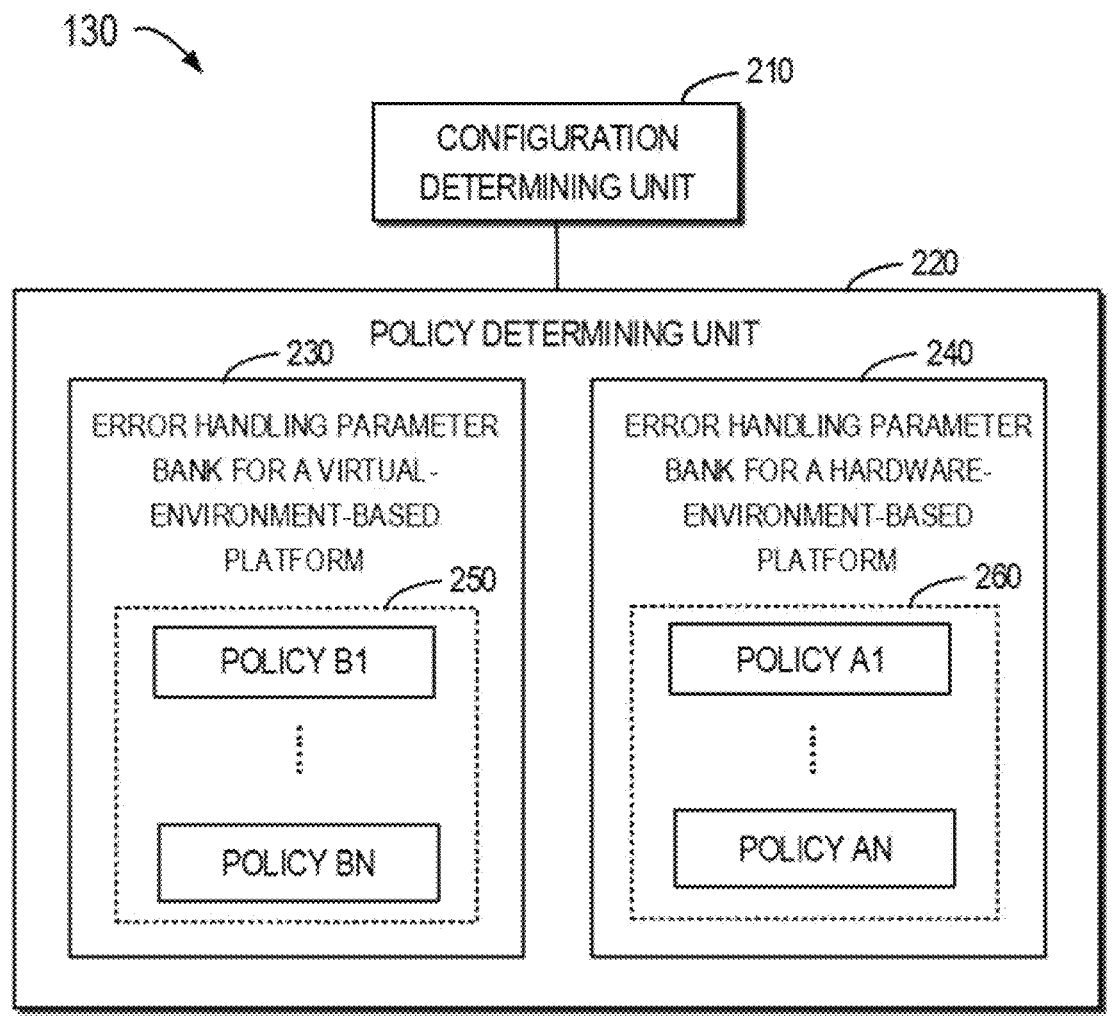
FIG. 2 illustrates a schematic of the apparatus for handling errors in the storage system according to the embodiments of the present disclosure.

FIG. 2 illustrates the schematic of the error handling apparatus 130 shown in FIG. 1. As shown in FIG. 2, the error handling apparatus 130 includes a configuration determining unit 210 and a policy determining unit 220 coupled to the configuration determining unit 210. The policy determining unit 220 includes all available configurations for different types of platforms (that is, hardware-environment-based platform or virtual-environment-based platform), and each configuration corresponds to the policy for handling errors. For example, the policy determining unit 220 shown in FIG. 2 may include an error handling parameter bank 240 for the hardware-environment-based platform and an error handling parameter bank 230 of the virtual-environment-based platform. The error handling parameter bank 240 for the hardware-environment-based platform includes various configurations and their respective policies (Policy A1, ..., Policy AN) and the error handling parameter bank 230 of the virtual-environment-based platform likewise includes various configurations and their respective policies (Policy B1, ..., Policy BN).

Depending on the type of platform 140 utilized by system 100 shown in FIG. 1 for determining errors, the configuration determining unit 210 is coupled with at least one of the hardware-environment-based platform or virtual-environment-based platform to determine the specific configuration of the platform 140. For instance, supposing that the type of platform 140 utilized by system 100 shown in FIG. 1 is the hardware-environment-based platform and the configuration determining unit 210 shown in FIG. 2, determines that the hardware-environment-based platform has a specific configuration of "configuration A1". Subsequently, based on the determined "configuration A1", the policy for handling errors corresponding to "configuration A1" (for example, "policy A1") is obtained in the policy determining unit 220. Then, when an error is detected, it is processed/handled with the "policy A1".

As stated above, such policy-based error handling is more efficient. In other words, such a more "intelligent" approach can reduce error handling time (during which read/write is prevented) substantially, thereby, providing a superior performance and adaptability between hardware environment (that is, physical environment) and virtual environment.

Figure 3:
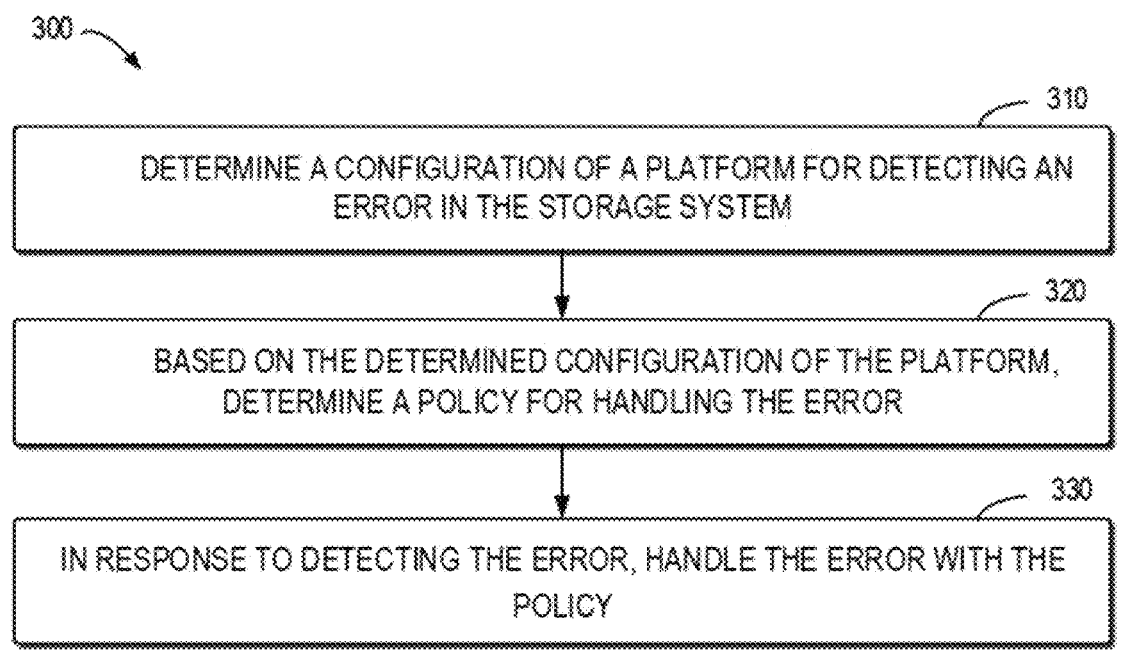
FIG. 3 illustrates a flow chart of the method for handling errors in the storage system according to an embodiment of the present disclosure.

Function/operation of the error handling system 100 shown in FIG. 1 will be described in detail with reference to FIG. 3 as below. Specifically, FIG. 3 illustrates a flow chart of the method 300 for handling errors in the storage system 100 according to the embodiments of the present disclosure. The method 300 can be executed by the error handling apparatus 130.

The method 300 starts at 310. At 310, configuration of platform 140 for detecting errors in the storage system is determined. According to the embodiments of the present disclosure, determining configuration of the platform 140 includes determining type of the platform 140, namely, detecting whether the platform 140 is hardware-environment-based platform or virtual-environment-based platform. It should be pointed out that the traditional solution does not take virtual environment and cloud storage into account. Therefore, as virtual environment and cloud storage are increasingly widely employed in cloud storage, particularly in enterprise storage, the original universal error handling policy may not be applicable to the virtual-environment-based platform or even incur problems. In comparison, the error handling method according to the embodiments of the present disclosure can provide a proper policy for handling errors for the platforms both under virtual environment and under physical environment.

As shown in FIG. 2, in the embodiments of the present disclosure, the configuration of platform 140 not only include the type of platform 140 but also include the specific model and working parameters and other details of platform 140. Correspondingly, policy associated with the configuration of platform 140 can also include detailed operation (or actions) of, for example, error handling, and time limit for error handling, which will be described more specifically in the following text.

Next, the method 300 proceeds to 320. At 320, based on the determined configuration of platform 140, policy for handling errors is determined. According to the embodiments of the present disclosure, different handling policies can include different actions of error handling and recovery. For instance, if it is determined that the platform 140 is a hardware-environment-based platform, the error handling policy can instruct the error handling apparatus 130 to implement one or more of the following error handling actions: (a) task abort for aborting storage task on the storage system: (b) one or more resets (including software reset, device reset, target reset and bus reset); (c) HBA restart for restarting HBA; and (d) storage device offline for removing a storage from the storage system.

Alternatively, or in addition, if it is determined that the platform 140 is a virtual-environment-based platform, the following error handling policies can be executed successively: (a) task abort for aborting storage task on the storage system; (b) one or more resets (including software reset and device reset) and (d) storage device offline for removing a storage device from the storage system. In this policy, each operation is started only if a previous operation fails.

It can be seen that compared with the hardware-environment-based platform, in the virtual-environment-based platform, as none of the target, bus and host is actually directly connected with the real hardware component, even if these operations are executed, it will not contribute to the error handling. On the contrary, such redundant reset configurations may be rather time-consuming in error handling so that the read/write hang becomes longer. Therefore, the above steps are omitted in the virtual-environment-based platform.

Particularly, in some embodiments, handling policy determined at 320 may include time limit for handling errors. In other words, in these embodiments, different time limits for handling errors can be configured according to different types and/or configured platform 140. For example, default time window for command timeout/retry times under the physical environment may not fit for virtual environment. Meanwhile, as the management program for virtual environment is usually managed inside to retry timeout command, compared with the hardware-based platform, the client operation system may need to have bigger timeout and smaller retry value.

Next, at 330, when an error is detected, the error is handled with the above corresponding policy. When the handling process is completed, the error handling system removes prevention of input request from the upper layer application and meanwhile returns the handling result to timeout to the upper layer. For example, for the virtual-environment-based platform, error handling operations, such as task abort, software reset, apparatus reset and storage offline, etc. can be executed within a time specified by error policy. For another example, for a hardware-environment-based platform, error handling operations, such as task abort, software reset, apparatus reset, target reset, bus reset, HBA restart and storage offline, etc. can be executed within a time specified by error policy.

Figure 4:
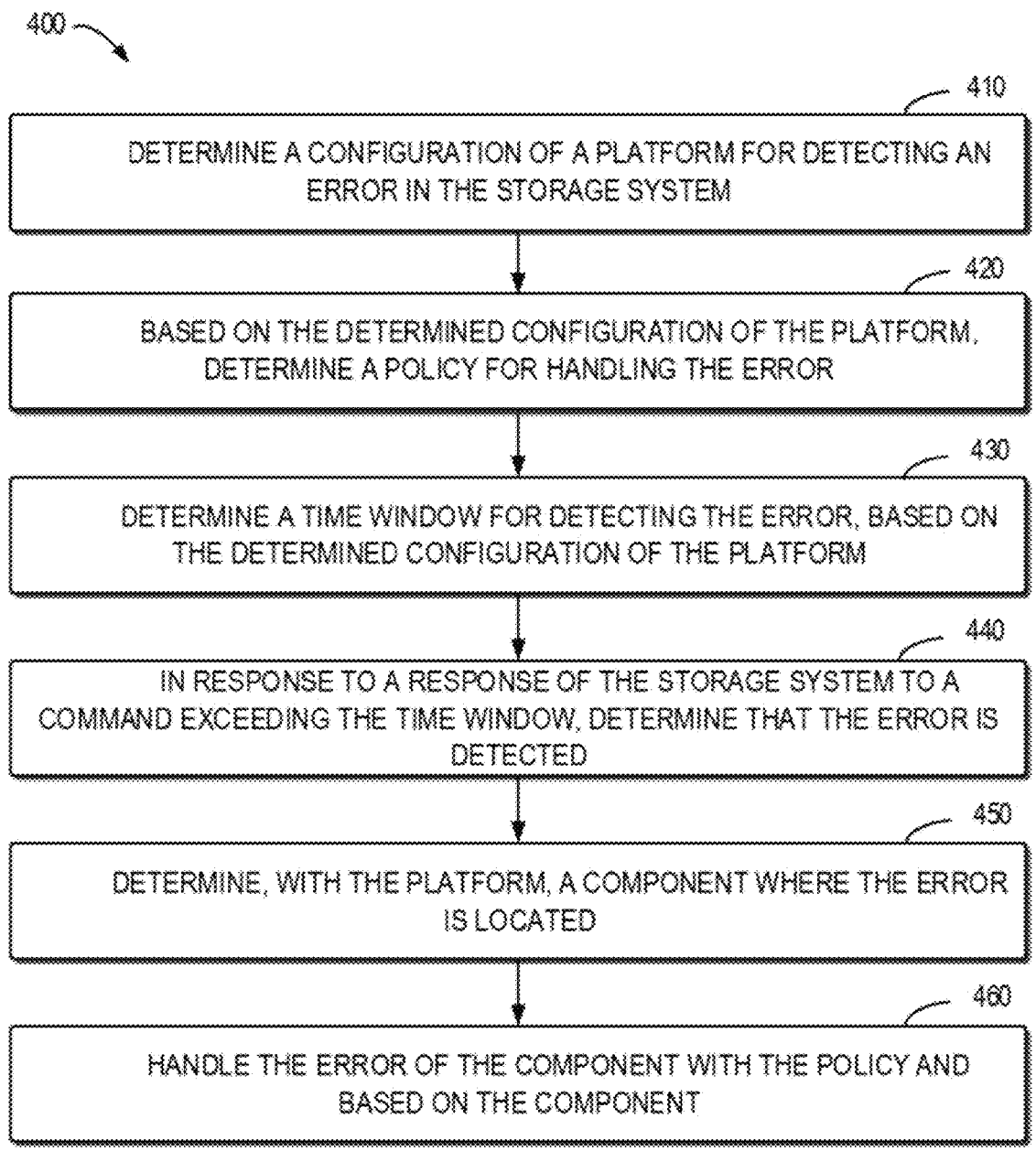
FIG. 4 illustrates a flow chart of the method for handling errors in the storage system according to another embodiment of the present disclosure.

FIG. 4 illustrates a flow chart of the method 400 for handling errors in the storage system according to anther embodiment of the present disclosure. Actions 410-420 of method 400 correspond to Actions 310-320 of method 300, respectively, thus omitted here. Optional additional actions included in method 300 will be described in the following text.

At 430, based on the determined configuration of platform 140, time window for detecting the error (that is, time window considered as command timeout) is determined. As discussed above, as default time window for command timeout under the physical environment may not fit for virtual environment, for instance, the management program for virtual environment is usually managed inside to retry timeout command, compared with hardware-environment-based platform, virtual-environment-based platform may require the operating system of client 110 to set larger timeout and smaller retry value accordingly.

At 440, when the response of the storage system to the command exceeds the time window, it is determined that an error is detected. Specifically, when the read/write request transmitted by the operating system of client 110 to the storage system 120 still obtains no response at the end of the time window, an error is determined to be detected and the error handling apparatus 130 is started subsequently to handle the error.

Next, at 450, when the error is detected, the component at which the failure occurs is determined with a platform 140. During the error handling process, it is advantageous to determine the failed component. For instance, if the command timeout is caused by the damage of the storage device such as the disk, then the restart operation of HBA it is essentially pointless. However, if the above "step-by-step" error handling manner is followed, the system would still trigger restart of HBA when the previous error handling step fails, which will prevent read/write from being assigned to the same HBA during the whole error handling process. As a restart of HBA may cause the error handling process to last for a long time (generally, only one HBA restart alone would take more than 10 seconds), the throughput of the system will thus be severely reduced, particularly when a large number of storage devices exist in the enterprise storage system. This handling process would cause the read/write already having timeout to be hung for even a longer time. From the perspective of upper layer application, read/write has been "stuck" and cannot obtain response, which is not allowed in many cases.

In some embodiments of the present disclosure, hardware storage topology in the form of directed acyclic graph (DAG) and error statistic data related to each node (for example, hardware component) in DAG can be used to help determining location of the error. This kind of proactive error detection will regularly check error statistics data at each node along the path from the disk to peripheral component interface express (PCIE) and analyze the problematic hardware components. The basic idea of the method lies in identifying the really failed component on the layer of the storage device through topology information and with error correlation information, such components comprising the disk itself, port, expanding port, expander, host terminal, HBA terminal and PCIE, etc. For instance, if it is found that all the disks connected to the same HBA have read/write errors, then we tend to consider the failure as a HBA failure (or a connection failure) instead of a drive failure.

Therefore, in some embodiments of the present disclosure, if it is determined that the platform 140 is a hardware-environment-based platform, then at least one of the following error information of the storage system is obtained: HBA and storage device. If it is determined that the platform 140 is a virtual-environment-based platform, then permanent device loss (PDL) error information of the storage device in the storage system is obtained, wherein the PDL error information indicates that the storage device can no longer be accessed.

Lastly, at 460, the component error is handled with policy based on the above error information. According to some embodiments, if it is determined that the platform 140 is a hardware-environment-based platform and HBA error information is obtained, then, as a response, trying the task abort operation aborting the storage task on the storage system is stopped and the HBA is restarted. According to some embodiments, if it is determined that the platform 140 is a hardware-environment-based platform and the storage device error information is obtained, as a response, trying the task abort operation aborting the storage task on the storage system is stopped and the storage device from the storage system is removed.

Figure 5:
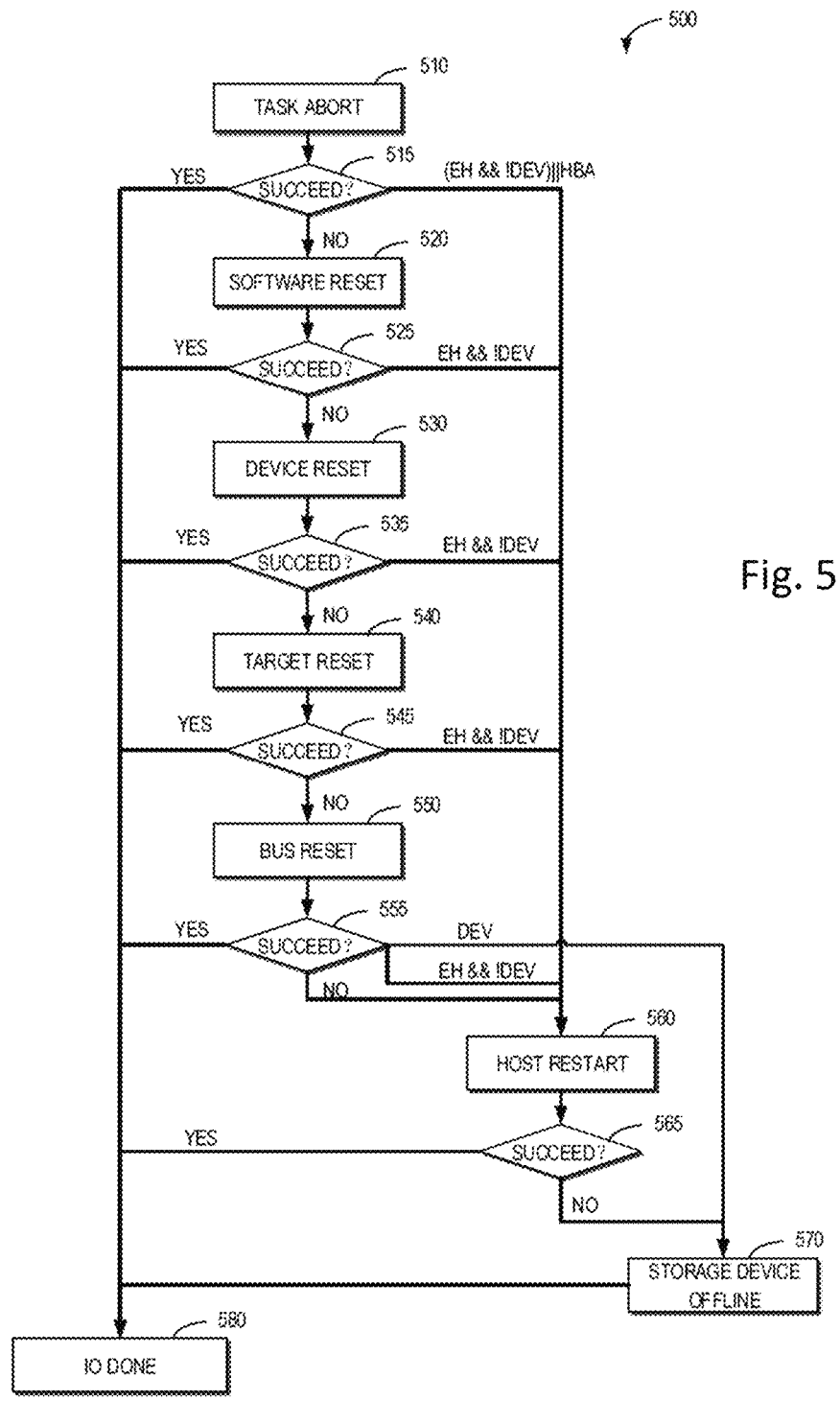
FIG. 5 illustrates a flow chart for handling errors using a policy in a hardware-environment-based platform in the storage system according to the embodiments of the present disclosure.

FIG. 5 illustrates a flow chart of method 500 for handling errors with policy in the storage system 120 under the hardware-environment-based platform according to the embodiments of the present disclosure. For the ease of illustration, the embodiment will be described with reference to SCSI system. Of course, its principle applies to storage system of other types. In the flow chart shown in FIG. 5 (and the following FIG. 6), "||" represents logical "OR" operation, "&&" represents logical "AND" operation, and "!" represents "NOT" operation.

In response to the occurrence of SCSI command overtime, the error handling process is started. At 510, the task abort operation is executed. If task abort 510 is determined to be successful at 515, then method 500 jumps to 580, where the I/O operation is executed. Otherwise, if it is identified that the error is caused by HBA (logically represented by "HBA"), then, it jumps to 560, or if it exceeds the error handling time limit (also called "timing overtime", logically represented by "EH") and meanwhile it cannot be determined if the error is caused by the storage device (logically represented by "! DEV"), it jumps to 560.

If it is determined, at 515, that step 510 fails, then software reset 520 is started. If it is determined, at step 525, that the software reset 520 succeeds, then it jumps to 580. If the timing runs overtime and meanwhile it cannot be determined if the error is caused by the storage device, it jumps to 560.

If it is determined at step 525 that operation 520 fails, then the device reset 530 is started. If it is determined at step 535 that the device reset 530 succeeds, then it jumps to 580 directly. If timing runs overtime and meanwhile it cannot be determined if the error is caused by the storage device, then it jumps to 560.

If it is determined at 535 that the device reset step 530 fails, then target reset 540 is started. If it is determined at step 545 that the target reset 540 is operated successfully, then it jumps 580 directly. If timing runs overtime and meanwhile it cannot be determined if the error is caused by the storage device, it jumps to 560.

If it is determined at step 545 that the target reset 540 fails, then the bus reset 550 is started. If it is determined at step 555 that bus reset 550 succeeds, then it jumps to 580 directly. If timing runs overtime and meanwhile it cannot be determined if the error is caused by the storage device, then it jumps to 560. If it is identified that the error is caused by the storage device (indicated by "DEV"), it jumps to 570, and then the failed storage device is removed from the storage system 120.

If it is determined at step 555 that the bus reset 550 fails, then HBA is restarted to start 560. If it is determined at 565 that HBA restart 560 succeeds, it jumps to operation 580 directly.

If it is determined at step 565 that the bus reset 560 fails, then the storage device offline 570 is started so that all the commands to the storage device return the state of "no connection" to the upper layer (for example, application layer). Lastly, the read/write done 580 is started to determine the handling result of overtime command that is returned to the upper layer.

Figure 6:
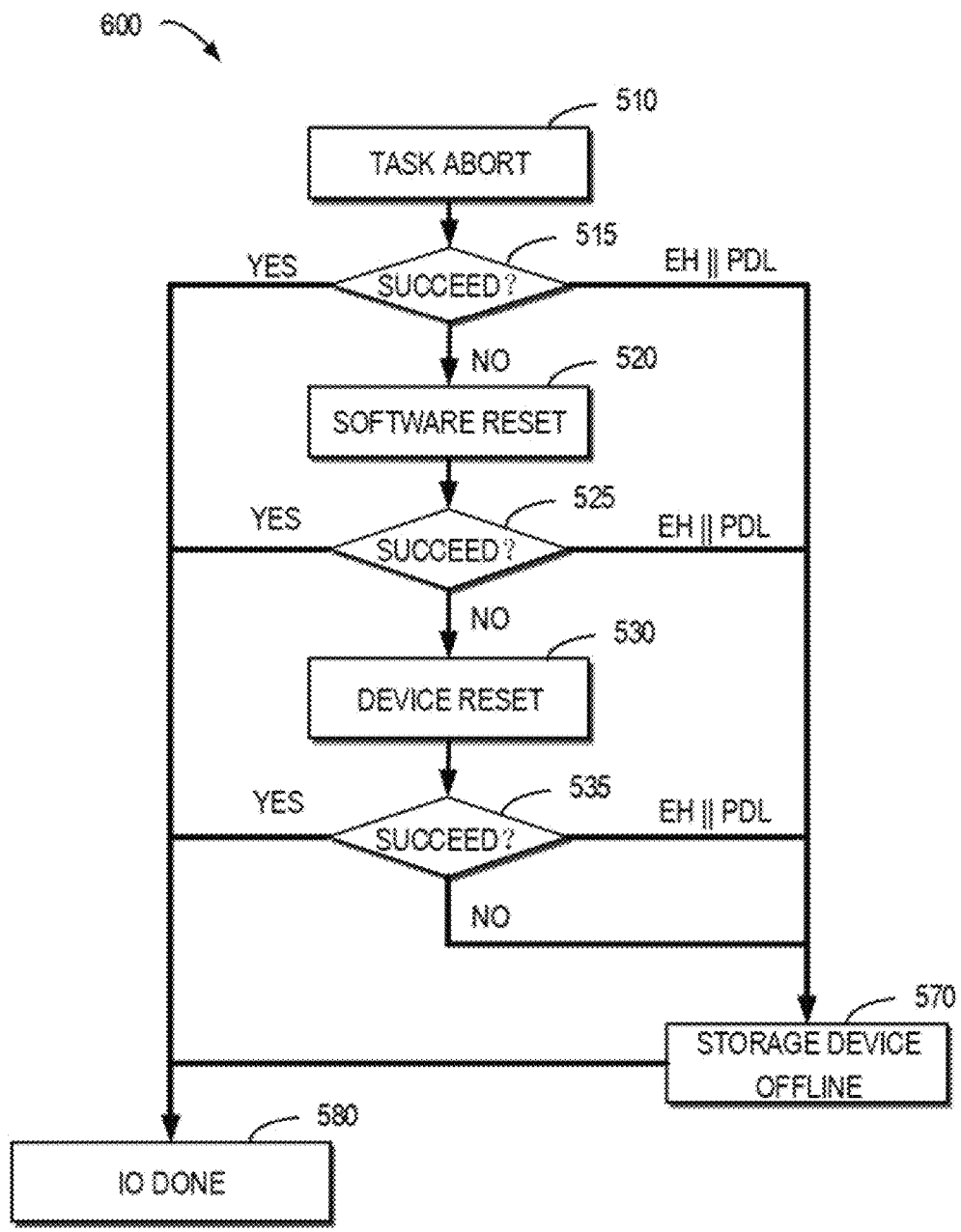
FIG. 6 illustrates a flow chart for handling errors using a policy in a virtual-environment-based platform in the storage system according to the embodiments of the present disclosure.

According to the embodiments of the present disclosure, when determining that the platform 140 is a virtual-environment-based platform and obtaining PDL error information, the storage device is removed from the storage system. FIG. 6 illustrates a flow chart for error handling 600 with a policy in a virtual-environment-based platform in the storage system according to the embodiments of the present disclosure. Similar to the physical-environment-based error handling flow 500 as shown in FIG. 5, error handling 600 is also performed in stepwise manner, while the difference lies in that in the virtual-environment-based platform, with the PDL status information, the error handling process will jump to storage device offline operation 570 directly. This is because in the virtual environment, it is pointless to execute (any) reset operations when the device has already been under the PDL condition. Therefore, with such policy simplification, the error handling time can be shortened effectively and redundant error handling and even unlimited read/write retries can be avoided. Thus, as shown in FIG. 6, when timing overtime (also indicated by "EH") or PDL state (indicated by "PDL") occurs, the error handling process jumps to operation 570 instantly to remove the failed storage device from the storage system 120.

Figure 7:
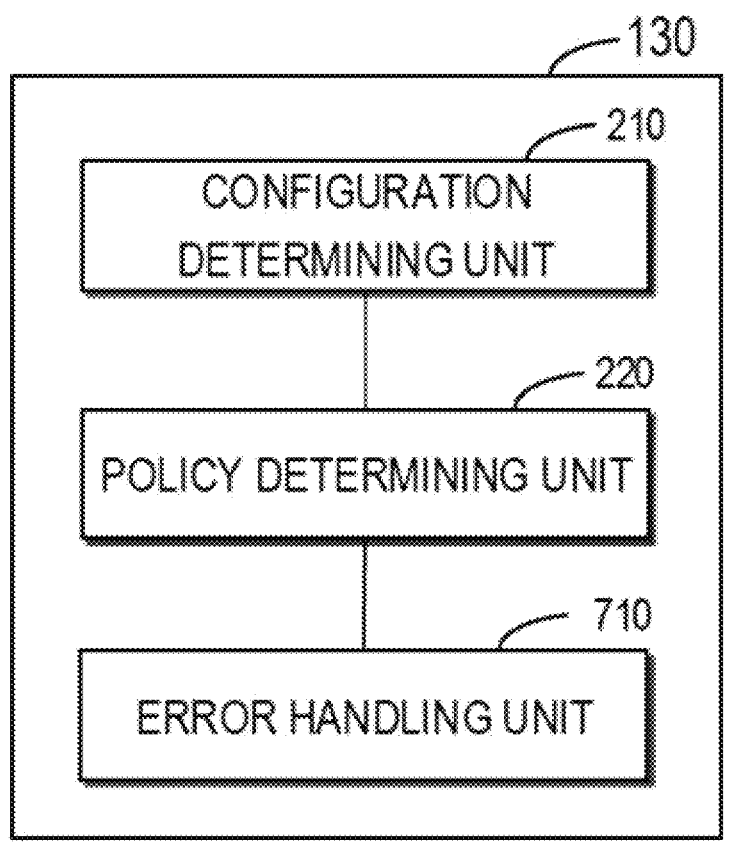
FIG. 7 illustrates a block diagram of the apparatus for handling errors in the storage system according to the embodiments of the present disclosure.

FIG. 7 illustrates a block diagram of the device 130 for handling errors in the storage system 120 according to the embodiments of the present disclosure. As shown, the device 130 includes the configuration determining unit 210 as shown in FIG. 1 which is configured to detect configuration of the failed platform 140 in the storage system; the policy determining unit 220 shown in FIG. 1 which is configured to determine policy for handling the errors based on the determined configuration of the platform 140; and an error handling unit 710 which is configured to process the error with the policy in response to detecting the error.

According to the embodiments of the present disclosure, the error handling device 130 further includes the time limit determining unit configured to determine the time limit for handling errors based on the determined configuration of the platform 140.

According to the embodiments of the present disclosure, the error handling device 130 further includes: an overtime time window determining unit configured to determine the time window for detecting errors based on the determined configuration of the platform 140; and an error handling triggering unit configured to determine that an error is detected in response to response of the storage system to the command exceeding the time window.

According to the embodiments of the present disclosure, the configuration determining unit 210 is configured to: detect whether the platform 140 is a hardware-environment-based platform or virtual-environment-based platform.

According to the embodiments of the present disclosure, the error handling device 130 includes: a failed component determining unit configured to determine, with the platform 140, the component where the error is located; and an error handling unit 710 configured to handle, with the policy, the error of the component based on the component.

According to the embodiments of the present disclosure, the error handling unit 710 is configured to: in response to determining that the platform 140 is a hardware-environment-based platform, obtain error information of at least one of the a HBA and a storage device in the storage system; and in response to determining that the platform 140 is a virtual-environment-based platform, obtain error information of a permanent device loss in the storage system.

According to the embodiments of the present disclosure, the error handling unit 710 is configured to: in response to determining that the platform 140 is a hardware-environment-based platform, obtain HBA error information in the storage system 120; and in response to obtaining the error information, stop trying the task abort operation aborting the storage task in the storage system and restart the HBA.

According to the embodiments of the present disclosure, the error handling unit 710 is configured to: in response to determining that the platform 140 is a hardware-environment-based platform, obtain error information of the storage device in the storage system 120; and in response to obtaining the error information, stop attempting a bus reset operation that resets the bus in the storage system 120; and remove the storage device from the storage system 120.

According to the embodiments of the present disclosure, the error handling unit 710 is configured to: in response to determining that the platform 140 is a virtual-environment-based platform, obtain error information of the permanent device loss of the storage device in the storage system; and in response to obtaining the error information of permanent device loss, remove the storage device from the storage system instantly.

Figure 8:
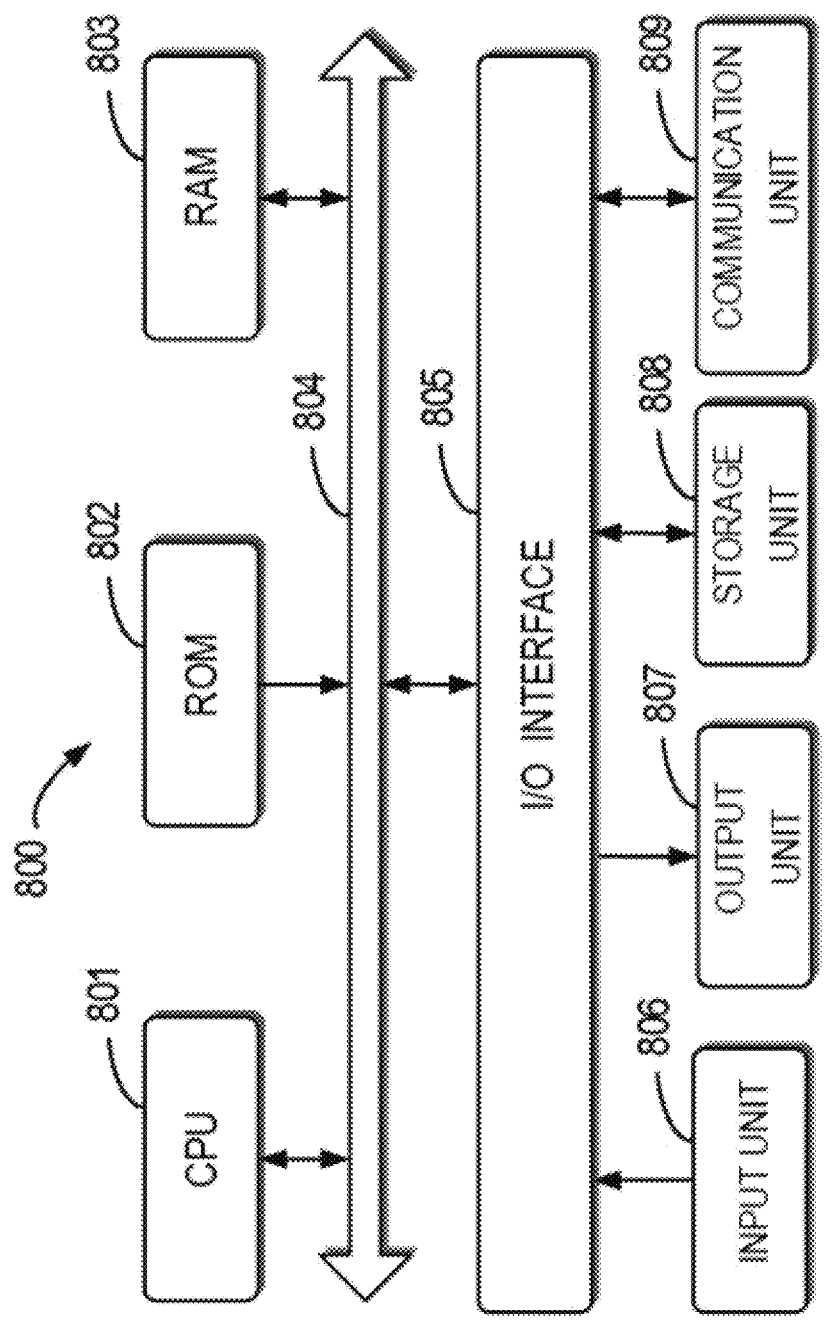
FIG. 8 illustrates a schematic block diagram of the apparatus according to the embodiments of the present disclosure.

FIG. 8 illustrates a schematic block diagram of the apparatus 800 that can be used to implement embodiments of the present disclosure. For instance, the error handling device 130 can be realized in the apparatus 800. As shown in the figure, the apparatus 800 includes a central processing unit (CPU) 801 which can implement varied proper actions and processing based on the computer program instructions stored in the read only memory (ROM) 802 or the computer program instructions uploaded from the storage unit 808 to the random access memory (RAM) 803. In RAM 803, varied programs and data required for operation of the storage device 800 can also be stored. CPU 801, ROM 802 and RAM 803 are connected with each other via bus 804. Input/output (I/O) interface 805 is also connected to bus 804.

A plurality of components in apparatus 800 are connected to I/O interface 805, comprising: an input unit 806, such as keyboard and mouse; an output unit 807, such as display and loudspeaker of various types; a storage unit 808, such as magnetic disk and compact disk, etc.; and a communicating unit 809, such as network card, modem or wireless communication transceiver, etc. Communicating unit 809 allows the apparatus 800 to communicate information/data with other devices via computer network such as internet and/or various telecommunication networks.

All the processes and processing described above, such as method 200 and/or 300, can be implemented by the processing unit 801. For example, in some embodiments, method 200 and/or 300 can be implemented as a computer software program which is corporeally incorporated in the machine readable medium, such as a storage unit 808. In some embodiments, a part of or the whole of a computer program can be loaded and/or mounted on apparatus 800 via ROM 802 and/or communicating unit 809. When loaded to RAM 803 and implemented by CPU 801, the computer program can implement one or more of the steps of method 200 and/or 300 described above.

To sum up, embodiments of the present disclosure provide a method and apparatus for processing errors in a storage system. The method and apparatus process errors in a more "intelligent" way and can work with higher adaptability in the virtual environment, thereby reducing the error handling time during which read/write is prevented so as to provide better performance for the system. Meanwhile, compared with the error handling method specific to the supplier or protocol, the method according to the embodiments of the present disclosure provides a more universal solution.

As a whole, various embodiments of the present disclosure can be implemented with hardware or dedicated circuit, software, logic or any combination thereof. Some embodiments can be implemented with hardware while some other aspects can be implemented with firmware or software. The firmware or software can be implemented by a controller, a microprocessor or other computing devices. Though aspects of the present disclosure are illustrated and depicted as block diagram, flow map or other drawings, it should be understood that the blocks, devices, systems, technologies or methods can be implemented by hardware, software, firmware, dedicated circuit or logic, universal hardware or controller or other computing devices or some combination thereof in a non-limiting manner.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the subject matter described herein but description of features only for specific embodiment. Certain features that are described in this specification in the context of separate embodiments can also be implemented in combination in a single embodiment. Conversely, various features that are described in the context of a single embodiment can also be implemented in multiple embodiments separately or in any suitable sub-combination.

Though the present disclosure has been described with specific structural features and/or method actions, it is to be understood that the scope of the technical solution defined in the appended claims is not necessarily limited to the specific features or actions described above. In other words, the present descriptions are only optional embodiments. To those skilled in the art, embodiments of the present disclosure may have various modifications and variations. Any modifications, equivalent replacements, and improvements within the spirit and principle of embodiments of the present disclosure should be included within the protection scope of embodiments of the present disclosure.

We claim:

1. A method of handling an error in a storage system, comprising:
   determining a platform utilized by the storage system;
   determining a configuration of the platform for detecting an error in the storage system;
   determining a policy for handling the error based on the determined configuration of the platform; and in response to detecting the error, handling the error with the policy, the handling the error with the policy comprising:
  in response to determining that the platform is a hardware-environment-based platform, obtaining error information of at least one of a host bus adapter and a storage device in the storage system; and
  in response to determining that the platform is a virtual-environment-based platform, obtaining error information of a permanent device loss of a storage device in the storage system.

2. The method according to claim 1, wherein the determining a policy for handling the error comprises:
  determining, based on the determined configuration of the platform, a time limit for handling the error.

3. The method according to claim 1, further comprising:
  determining, based on the determined configuration of the platform, a time window for detecting the error; and
  in response to a response of the storage system to a command exceeding the time window, determining that the error is detected.

4. The method according to claim 1, wherein the handling the error with the policy comprises:
  determining, with the platform, a component where the error is located; and
  handling, with the policy, the error of the component based on the component.

5. The method according to claim 1, wherein the obtaining error information of at least one of a host bus adapter and a storage device in the storage system includes obtaining error information of the host bus adapter, and wherein the method further comprises, in response to determining that the platform is the hardware-environment-based platform;
  in response to obtaining the error information of the host bus adapter:
    stopping attempting a task abort operation that aborts a storage task in the storage system; and
    restarting the host bus adapter.

6. The method according to claim 1, wherein the obtaining error information of at least one of a host bus adapter and a storage device in the storage system includes obtaining error information of the storage device, and wherein the method further comprises in response to determining that the platform is the hardware-environment-based platform:
  in response to obtaining the error information of the storage device:
    stopping attempting a bus reset operation that resets a bus of the storage system; and
    removing the storage device from the storage system.

7. The method according to claim 1, further comprising, in response to determining that the platform is the virtual-environment-based platform:
  in response to obtaining the error information of the permanent device loss of the storage device, removing the storage device from the storage system.

8. A device for handling errors in a storage system, comprising:
  a processor configured to:
    determine a platform utilized by the storage system;
    determine a configuration of the platform for detecting an error in the storage system;
    determine a policy for handling the error based on the determined configuration of the platform; and
    in response to detecting the error, handle the error with the policy,
  wherein, in handling the error with the policy, the processor is further configured to:
    in response to the platform being determined to be a hardware-environment-based platform, obtain error information of at least one of a host bus adapter and a storage device in the storage system; and
    in response the platform being determined to be a virtual-environment-based platform, obtain error information of a permanent device loss of a storage device in the storage system.

9. The device according to claim 8, wherein the processor is further configured to:
  determine, based on the determined configuration of the platform, a time limit for handling the error.

10. The device according to claim 8, wherein the processor is further configured to:
  determine, based on the determined configuration of the platform, a time window for detecting the error, and
  in response to a response of the storage system to a command exceeding the time window, determine that the error is detected.

11. The device according to claim 8, wherein the processor is further configured to:
  determine, with the platform, a component where the error is located; and
  handle, with the policy, the error of the component based on the component.

12. The device according to claim 8, wherein error information is obtained of the host bus adapter in the storage system, and wherein the processor is further configured in response to determining that the platform is the hardware-environment-based platform, to:
  in response to the error information being obtained of the host bus adapter:
    stop attempting a task abort operation that aborts the storage task on the storage system; and
    restart the host bus adapter.

13. The device according to claim 8, wherein error information is obtained of the storage device in the storage system, and wherein the processor is further configured, in response to determining that the platform is the hardware-environment-based platform, to:
  in response to the error information being obtained of the storage device:
    stop attempting a bus reset operation that resets a bus of the storage system; and
    remove the storage device from the storage system.

14. The device according to claim 8, wherein the processor is further configured, in response to determining that the platform is the virtual-environment-based platform, to:
  in response to the error information being obtained of the permanent device loss of the storage device, remove the storage device from the storage system.

15. A computer program product for handling an error in a storage system, comprising:
  a non-transitory computer readable medium encoded with computer-executable code, the code configured to enable the execution of:
    determining a platform utilized by the storage system;
    determining a configuration of the platform for detecting an error in the storage system;
    determining a policy for handling the error based on the determined configuration of the platform; and
    in response to detecting the error, handling the error with the policy, the handling the error with the policy comprising:
      in response to determining that the platform is a hardware-environment-based platform, obtaining error information of at least one of a host bus adapter and a storage device in the storage system; and in response to determining that the platform is a virtual-environment-based platform, obtaining error information of a permanent device loss of a storage device in the storage system.

16. The computer program product of claim 15, wherein the determining a policy for handling the error comprises:

determining, based on the determined configuration of the platform, a time limit for handling the error.

17. A method of handling errors in a storage system, comprising:

determining whether a platform utilized by the storage system is a hardware-environment-based platform or a virtual-environment-based platform;

in response to determining that the platform is the hardware-environment-based platform:

determining a configuration of the hardware-environment-based platform for detecting a first error in the storage system;

determining a first policy for handling the first error based on the configuration of the hardware-environment-based platform; and in response to detecting the first error, handling the first error with the first policy; and in response to determining that the platform is the virtual-environment-based platform:

determining a configuration of the virtual-environment-based platform for detecting a second error in the storage system;

determining a second policy for handling the second error based on the configuration of the virtual-environment-based platform; and in response to detecting the second error, handling the second error with the second policy.

* * * * *